(12) United States Patent
Xu et al.

(10) Patent No.: US 10,494,757 B2
(45) Date of Patent: Dec. 3, 2019

(54) METHOD FOR CONTROLLING EXPANSION VALVE OF FREQUENCY CONVERSION HEAT PUMP CLOTHES DRYER

(71) Applicant: QINGDAO HAIER WASHING MACHINE CO., LTD., Qingdao, Shandong (CN)

(72) Inventors: Sheng Xu, Shandong (CN); Huacheng Song, Shandong (CN); Shujun Tian, Shandong (CN); Shiqiang Shan, Shandong (CN)

(73) Assignee: QINGDAO HAIER WASHING MACHINE CO., LTD., Qingdao, Shandong (CN)

( * ) Notice: Subject to any disclaimer, the term of this patent is extended or adjusted under 35 U.S.C. 154(b) by 210 days.

(21) Appl. No.: 15/550,203

(22) PCT Filed: Jul. 3, 2015

(86) PCT No.: PCT/CN2015/083308
§ 371 (c)(1),
(2) Date: Aug. 10, 2017

(87) PCT Pub. No.: WO2016/127553
PCT Pub. Date: Aug. 18, 2016

(65) Prior Publication Data
US 2018/0274166 A1     Sep. 27, 2018

(30) Foreign Application Priority Data
Feb. 11, 2015   (CN) .......................... 2015 1 0072519

(51) Int. Cl.
*D06F 58/28*     (2006.01)
*D06F 58/20*     (2006.01)

(52) U.S. Cl.
CPC ............ *D06F 58/28* (2013.01); *D06F 58/206* (2013.01); *D06F 2058/287* (2013.01); *D06F 2058/2854* (2013.01)

(58) Field of Classification Search
None
See application file for complete search history.

(56) References Cited

U.S. PATENT DOCUMENTS

| | | | |
|---|---|---|---|
| 7,191,543 B2 * | 3/2007 | Yakumaru | D06F 58/206 34/77 |
| 7,322,123 B2 * | 1/2008 | Tadano | D06F 43/086 34/77 |

(Continued)

FOREIGN PATENT DOCUMENTS

| | | |
|---|---|---|
| CN | 102762791 A | 10/2012 |
| CN | 103306116 A | 9/2013 |

(Continued)

OTHER PUBLICATIONS

International Search Report (PCT/ISA/210) dated Nov. 19, 2015, by the State Intellectual Property Office of the P.R. China as the International Searching Authority for International Application No. PCT/CN2015/083308.

(Continued)

*Primary Examiner* — David J Laux
(74) *Attorney, Agent, or Firm* — Buchanan Ingersoll & Rooney PC

(57) ABSTRACT

A method for controlling an expansion valve of a frequency conversion heat pump clothes dryer. The open degree of the valve is adjusted through parameters such as the operation time/power/current at a frequency of the frequency conversion compressor; a reference value of the operation time/power/current at a certain frequency is set, and compared with an actual value of the operation time/power/current at the certain frequency of the compressor; if the actual value (Continued)

of the operation time is less than the set reference value or the actual value of the power/current is greater than the reference value, the open degree of the expansion value is increased; and if the actual value of the operation time is greater than the set reference value or the actual value of the power/current is less than the set reference value, the open degree of the expansion valve is decreased.

16 Claims, 4 Drawing Sheets

(56) References Cited

U.S. PATENT DOCUMENTS

| | | | | |
|---|---|---|---|---|
| 8,393,172 | B2* | 3/2013 | Sato | D06F 58/206 34/201 |
| 9,372,031 | B2* | 6/2016 | Contarini | D06F 58/206 |
| 2011/0280736 | A1 | 11/2011 | Lee et al. | |
| 2012/0079735 | A1* | 4/2012 | Lee | D06F 58/206 34/443 |
| 2012/0186305 | A1* | 7/2012 | Taniguchi | D06F 25/00 68/19 |
| 2013/0232813 | A1 | 9/2013 | Heo et al. | |
| 2014/0290091 | A1* | 10/2014 | Bison | D06F 58/206 34/524 |
| 2015/0082658 | A1* | 3/2015 | Contarini | D06F 58/206 34/524 |
| 2016/0002843 | A1* | 1/2016 | Han | D06F 58/206 34/427 |

FOREIGN PATENT DOCUMENTS

| | | |
|---|---|---|
| CN | 104005214 A | 8/2014 |
| JP | 2005069539 A | 3/2005 |
| WO | WO 2005075728 A1 | 8/2005 |
| WO | WO 2011080045 A1 | 7/2011 |

OTHER PUBLICATIONS

Written Opinion (PCT/ISA/237) dated Nov. 19, 2015, by the State Intellectual Property Office of the P.R. China as the International Searching Authority for International Application No. PCT/CN2015/083308.

* cited by examiner

METHOD FOR CONTROLLING EXPANSION VALVE OF FREQUENCY CONVERSION HEAT PUMP CLOTHES DRYER

TECHNICAL FIELD

The present disclosure relates to the field of clothes dryers, in particular to a method for controlling an expansion valve of a frequency conversion heat pump clothes dryer.

BACKGROUND ART

In daily life, clothes are mostly dried naturally, but it needs more time, especially in the rainy season in the South of China, clothes are hardly thoroughly dried even naturally dried for many days. Therefore, clothes dryers are very popular with customers. However, current clothes dryers mostly have a simple drying mode; and customers have further demands on human-friendly operation modes, which are mainly reflected in the following three aspects. Demand 1: it is required to have low noise when a dryer is used at night. Demand 2: when a user is in a hurry to dry clothes, the user's high demand on drying speed needs to be met. Demand 3: when the user is not in a hurry to dry clothes, the user's demand on low power consumption of the dryer becomes high and it needs to meet the requirement of the user for power saving.

In the operation of the existing refrigeration system, the expansion valve is generally adjusted on the basis of the temperature difference between an inlet and an outlet of an evaporator. For example, the outlet temperature TS and the inlet surface temperature Te of the evaporator are detected and then compared with a target superheat TSH=5K, wherein SH=TS-Te-TSH, ΔSH=SH-SH (previous). If superheat SH is positive, it is necessary to increase the flow rate, and compares SH with the previous superheat. If the superheat has a trend of decrease, and the intensity of the adjustment is small. When compared with the previous superheat, and if the superheat has a trend of increase, then the intensity of the increase degree is large. If the SH is negative, it is necessary to decrease the flow rate and compares SH with the previous superheat. If the superheat has a trend of increase, and intensity of the adjustment degree is small; when compared with the previous superheat, if the superheat has a trend of decrease, and then the intensity of the decrease is small. This control method can ensure the maximization of the effective heat exchange area of the evaporator to ensure that the refrigerant in the evaporator evaporates sufficiently. But it is required to arrange temperature sensors on both sides of the evaporator. The type of electric control panel of the product can be increased.

In view of foregoing, the present disclosure is provided.

SUMMARY OF THE INVENTION

The present disclosure is intended to overcome the shortcomings of the prior art and to provide a method for controlling an expansion valve of a frequency conversion heat pump clothes dryer so that the open degree of an expansion valve is adjusted according to the parameters of a compressor without a temperature sensor.

In order to achieve this object, the present disclosure adopts the following technical solution. A method for controlling an expansion valve of a frequency conversion heat pump clothes dryer, wherein a frequency conversion compressor of the clothes dryer comprises a frequency ascending stage, a frequency retaining stage, and a frequency descending stage. The open degree of the electronic expansion valve is adjusted through parameters such as the operation time/power/current at an operation frequency/a certain frequency of the frequency conversion compressor.

In the same clothes drying mode, a reference value of the operation time/power/current at the certain frequency is set, and an actual value of the operation time/power/current at the certain frequency of the compressor and the set reference value are compared. If the actual value of the operation time at the certain frequency is less than the set reference value or the actual value of the power/current is greater than the reference value, the open degree of the expansion value is turned up. And if the actual value of the operation time at the certain frequency is greater than the set reference value or the actual value of the power/current is less than the set reference value, the open degree of the expansion valve is turned down.

In the frequency descending stage, the operation frequency of the frequency conversion compressor gradually decreases from a set target frequency in stages, and the open degree of the expansion valve is correspondingly turned up in stages.

The clothes dryer at least comprises a first drying mode and a second drying mode. The operation time of the compressor in a high frequency band in the first drying mode is longer than the operation time of the frequency conversion compressor in the high frequency band in the second drying mode. The open degree of the expansion valve in the first drying mode when it enters in the frequency descending stage is larger than the open degree of the expansion valve in the second drying mode when it enters in the frequency descending stage.

In the frequency descending stage, when the detected temperature rises to $T_{11}°$ C. in the first drying mode, the operation frequency of the frequency conversion compressor decreases from a target frequency $f_n$ Hz to $f_1$ Hz and the open degree of the expansion valve is adjusted to the pulse open degree $k_{11}$ from $k_{1n}$. When the detected temperature rises to $T_{21}°$ C. in the second drying mode, the operation frequency of the frequency conversion compressor decreases from the target frequency $f_n$ Hz to f1 Hz and the open degree of the expansion valve is adjusted to the pulse open degree $k_{21}$ from $k_{2n}$. Wherein, $T_{11}>T_{21}$, $k_{1n}>k_{2n}$, $k_{11}>k_{21}$.

When the clothes dryer starts operating, the expansion valve is adjusted to close to a fully closed state and then opened to a first open degree and then the compressor is started. After the compressor finishes frequency ascending, the expansion valve is opened to a second open degree and the compressor enters in the frequency retaining stage. Preferably, the operation of adjusting the expansion valve to close to a fully closed state is: firstly, closing the expansion valve, and then opening for a small open degree and then closing for a large open degree, repeating such operations for several times to ensure that the expansion valve is in a fully closed state.

The clothes dryer further comprises a third drying mode. The operation time of the compressor in a high frequency band in the third drying mode is shorter than the operation time of the compressor in the high frequency band in the second drying mode; the open degree of the expansion valve in the third drying mode when it enters in the frequency descending stage is smaller than the open degree of the expansion valve in the second drying mode when it enters in the frequency descending stage.

In the frequency descending stage, when the detected temperature rises to $T_{31}°$ C. in the third drying mode, the operation frequency of the frequency conversion compressor decreases from the target frequency $f_n$ Hz to $f_1$ Hz and the open degree of the expansion valve is adjusted to the pulse open degree $k_{31}$ from $k_{3n}$. When the detected temperature rises to $T_{21}°$ C. in the second drying mode, the operation frequency of the frequency conversion compressor decreases from the target frequency $f_n$ Hz to $f_1$ Hz and the open degree of the expansion valve is adjusted to the pulse open degree $k_{21}$ from $k_{2n}$. Wherein, $T_{21}>T_{31}$, $k_{2n}>k_{3n}$, $k_{21}>k_3$.

In the frequency descending stage, when the detected temperature rises to $T_{12}°$ C. in the first drying mode, the operation frequency of the frequency conversion compressor decreases from $f_1$ Hz to $f_2$ Hz and the open degree of the expansion valve is adjusted to the pulse open degree $k_{12}$ from $k_{11}$ until the detected temperature rises to $T_{1m}°$ C. Then, the operation frequency of the frequency conversion compressor decreases from $f_2$ Hz to $f_m$ Hz and the open degree of the expansion valve is adjusted to the pulse open degree $k_{1m}$ from $k_{12}$ until the clothes drying operation is finished. When the detected temperature rises to $T_{22}°$ C. in the second drying mode, the operation frequency of the frequency conversion compressor decreases from $f_1$ Hz to $f_2$ Hz and the open degree of the expansion valve is adjusted to the pulse open degree $k_{22}$ from $k_{21}$ until the detected temperature rises to $T_{2m}°$ C. Then, the operation frequency of the frequency conversion compressor decreases from $f_2$ Hz to $f_m$ Hz and the open degree of the expansion valve is adjusted to the pulse open degree $k_{2m}$ from $k_{22}$ until the clothes drying operation is finished. Wherein, $T_{12}>T_{22}$, $T_{1m}>T_{2m}$, $k_{12}>k_{22}$, and $k_{1m}>k_{2m}$.

In the frequency descending stage, when the detected temperature rises to $T_{32}°$ C. in the third drying mode, the operation frequency of the frequency conversion compressor decreases from $f_1$ Hz to $f_2$ Hz and the open degree of the expansion valve is adjusted to the pulse open degree $k_{32}$ from $k_{31}$ until the detected temperature rises to $T_{3m}°$ C. Then, the operation frequency of the frequency conversion compressor decreases from $f_2$ Hz to $f_m$ Hz and the open degree of the expansion valve is adjusted to the pulse open degree $k_{3m}$ from $k_{32}$ until the clothes drying operation is finished. When the detected temperature rises to $T_{22}°$ C. in the second drying mode, the operation frequency of the frequency conversion compressor decreases from $f_1$ Hz to $f_2$ Hz and the open degree of the expansion valve is adjusted to the pulse open degree $k_{22}$ from $k_{21}$ until the detected temperature rises to $T_{2m}°$ C. Then, the operation frequency of the frequency conversion compressor decreases from $f_2$ Hz to $f_m$ Hz and the open degree of the expansion valve is adjusted to the pulse open degree $k_{2m}$ from $k_{22}$ until the clothes drying operation is finished. Wherein, $T_{22}>T_{32}$, $T_{2m}>T_{3m}$, $k_{22}>k_{32}$, and $k_{2m}>k_{3m}$.

With the technical solution of the present disclosure, the following beneficial effects are brought about:

1. The method for controlling an expansion valve according to the present disclosure does not use an additional temperature sensor and adjusts the open degree of the expansion valve by virtue of the parameters of a compressor. The parameters of the compressor can be directly obtained by the frequency converter of the compressor, and therefore the part of detecting temperature by a temperature sensor can be omitted and the control part can be simplified.

2. The clothes dryer according to the present disclosure provides a variety of drying modes so that users can choose proper drying modes according to their own needs; users are provided with more choices. One machine can be applied to different crowds, thus improving the versatility of the clothes dryer; moreover, with a variety of drying modes, the diversity and flexibility of the clothes dryer are enhanced, which meets the people's different demands in different periods of time and further fits people's diversified, high-speed, efficient pace of life, thus enhancing the humane friendliness of the clothes dryer.

3. In the plurality of drying modes of the clothes dryer according to the present disclosure, the frequency of the frequency conversion compressor rises to a set target frequency, and the drying modes are divided by the operation time at the set target frequency, i.e., a high frequency band. The compressor operates under a full load in the plurality of drying modes so that the compressor reaches the highest efficiency and thus can be used to the greatest extent. The clothes dryer avoids working for a long time under a low load with low efficiency; in addition, the clothes dryer also avoids working under a high load for a long time, thereby not causing a damage to the compressor or reducing the service life of the compressor.

4. The first drying mode of the drying modes of the present disclosure can solve the problem of fast drying and is suitable for people who need dry clothes fast. The third drying mode can solve the problem of drying noise and is suitable for people who care low drying noise rather than drying speed. The second drying mode can achieve proper matching of energy saving and drying speed and therefore is suitable for people who do not care drying speed and drying noise.

Specific embodiments of the present disclosure will now be described in further detail with reference to the accompanying drawings.

DETAILED DESCRIPTION OF THE PREFERRED EMBODIMENTS

Figure 1:
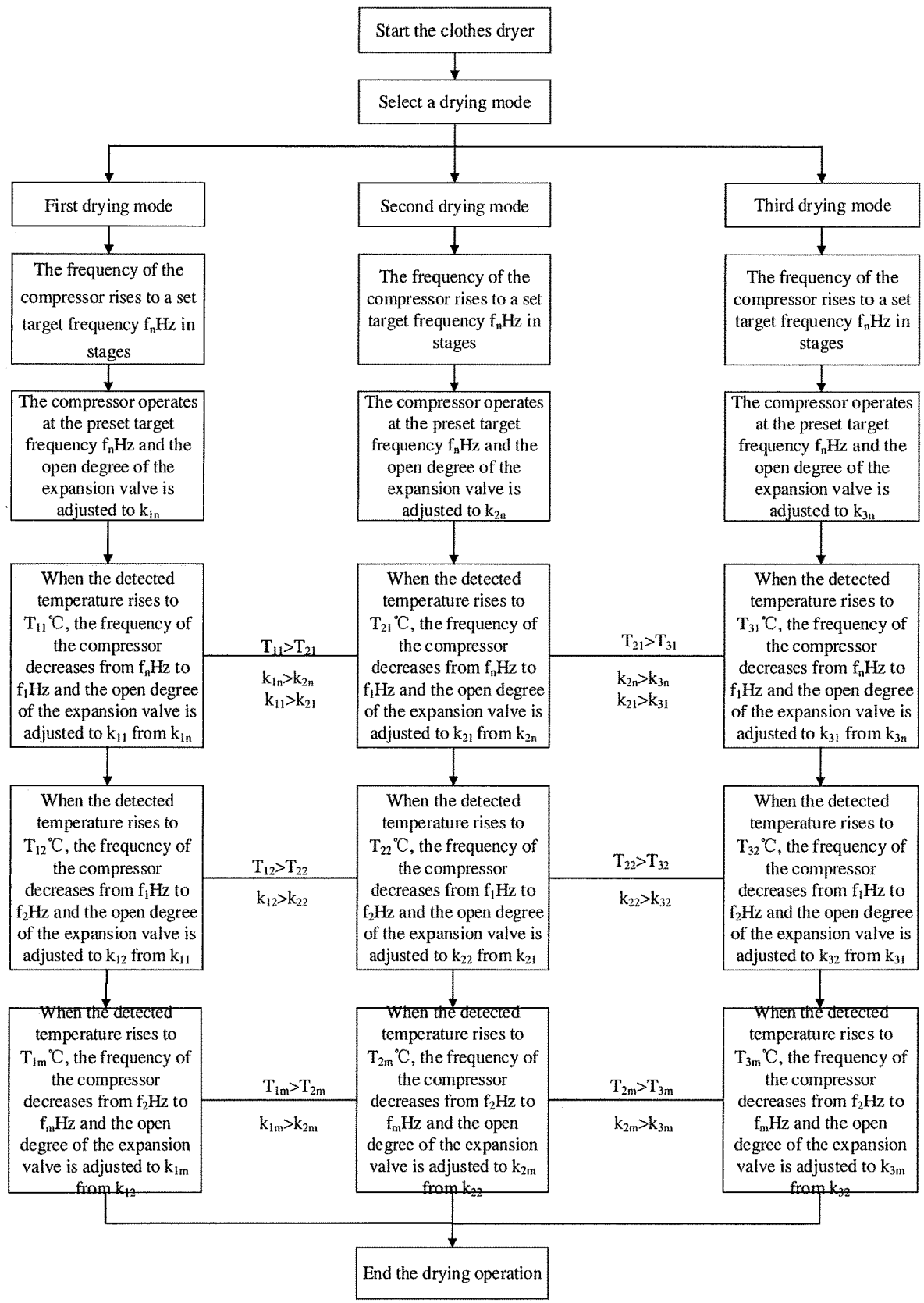
FIG. 1 is a flow chart of the drying mode control according to the present disclosure.

Provided is a method for controlling an expansion valve of a frequency conversion heat pump clothes dryer, wherein a frequency conversion compressor of the clothes dryer comprises a frequency ascending stage, a frequency retaining stage, and a frequency descending stage. The open degree of the electronic expansion valve can be adjusted through parameters such as the operation time/power/current at an operation frequency/a certain frequency of the frequency conversion compressor. Without using an additional temperature sensor, the open degree of the expansion valve is adjusted by virtue of the parameters of a compressor. The parameters of the compressor are directly obtained by the frequency converter of the compressor, and therefore the part of detecting temperature by a temperature sensor is omitted and the control part is simplified. The operation time at a certain frequency is the time the frequency conversion compressor operates stably at a frequency within the operation frequency range.

Specifically, in the same clothes drying mode, a reference value of the operation time/power/current at the certain frequency is set, and an actual value of the operation time/power/current at the certain frequency of the compressor and the set reference value are compared. If the actual value of the operation time at the certain frequency is less than the set reference value or the actual value of the power/current is greater than the reference value, the open degree of the expansion value is turned up. And if the actual value of the operation time at the certain frequency is greater than the set reference value or the actual value of the power/current is less than the set reference value, the open degree of the expansion valve is turned down. In this way, it is only required to write the reference value of the set operation time/power/current at the frequency into the control panel of a washing machine, the actual value of the operation time/power/current at the frequency, which is directly obtained during operation, is compared with the reference value to control the open degree of the expansion valve, and the control operation is simple. In the same mode, if the operation time at a certain frequency is long, temperature rises slowly on the contrary, and because the final temperature setting is the same, the open degree should be turned down. However, in different drying modes, if the operation time at a certain frequency is long, the final temperature/power/current will become high and the reference open degree of the expansion valve at the frequency will be high.

The frequency conversion compressor of the clothes dryer comprises a frequency ascending stage, a frequency retaining stage, and a frequency descending stage. In the frequency descending stage, the operation frequency of the frequency conversion compressor gradually decreases from a set target frequency in stages, and the open degree of the expansion valve is correspondingly turned up in stages.

In different drying modes, the reference operation time/power/current is different itself. In the mode where the longer the reference operation time at a certain frequency, the larger the open degree of the expansion valve at the same frequency band relative to other modes. In the mode where the greater the reference target power/current at a certain frequency, the larger the open degree of the expansion valve at the same frequency band relative to other modes.

In the same drying mode, if the actual temperature rise speed of the compressor system at a certain frequency band is higher than the reference temperature rise speed (that is, shorter time), the open degree will be adjusted larger on the basis of the reference open degree of the expansion valve in this mode. If the actual power/current of the compressor system at a certain frequency band is higher than the reference power/current, the open degree will be adjusted larger on the basis of the reference open degree of the expansion valve in this mode.

As illustrated in FIG. 1, the clothes dryer at least comprises two drying modes: a first drying mode and a second drying mode. The operation time of the compressor in a high frequency band in the first drying mode is longer than the operation time of the frequency conversion compressor in the high frequency band in the second drying mode. The open degree of the expansion valve in the first drying mode when it enters in the frequency descending stage is larger than the open degree of the expansion valve in the second drying mode when it enters in the frequency descending stage. The drying speed in the first drying mode is higher than the drying speed in the second drying mode, the power consumption in the second drying mode is lower than that in the first drying mode, and users can, according to their own actual conditions, select drying modes, and the control panel is provided with control buttons for drying modes so that the users can select drying modes through the buttons on the panel.

In the first drying mode, the operation frequency or speed of a fan is higher than or equal to the operation frequency or speed of the fan in the second drying mode. It is preferable that the operation frequency or speed of the fan in the first drying mode is higher than the operation frequency or speed of the fan in the second drying mode, and the circulation of air takes away the hot and humid air from a drum and brings in hot and dry air, thus taking water away from clothes in the drum. The higher the operation frequency or speed of the fan, the faster the air circulation, water of clothes in the drum can be taken away more easily and the clothes can be dried faster.

The frequency conversion compressor comprises a frequency ascending stage, a frequency retaining stage, and a frequency descending stage. After the compressor is started, the operation frequency of the compressor gradually rises from a low frequency to the maximum operation frequency (i.e., the set target frequency), rather than directly operating at the maximum operation frequency. The rise of the operation frequency of the frequency conversion compressor is also able to be divided into multiple stages. The compressor operates for 0.5-3 minutes after each frequency stage is reached until it operates steady and then the operation frequency rises to another frequency stage at a rate of 1 Hz/s~1 Hz/60 s; (e.g., 28~40 Hz/s; 40~50 Hz/s; 50~60 Hz/s). Here it does not directly rise to the highest speed for the following reasons: to prevent the phenomenon that the return amount of oil inside the compressor from a heat exchanger back to the compressor is less than the amount of oil discharged, resulting in poor lubrication and increase of the wear of the internal parts of the compressor, when the operation frequency (i.e., the rotation speed) rises too rapidly. To prevent the phenomenon that a liquid refrigerant enters the compressor to dilute the lubricant inside the compressor because the refrigerant of the evaporator does not completely evaporate at the beginning, thus resulting in poor lubrication. In the frequency ascending state, the operation current I of the compressor needs to be monitored; if the condenser surface temperature reflecting condensation temperature and the compressor exhaust temperature reflecting the inside temperature of the compressor reach required limit values, the frequency is retained, and therefore the frequency will not rise any more even though the frequency does not rise to the target rotation rate.

Furthermore, the frequency of the frequency conversion compressor reaches the set target frequency, that is, the compressor operates under a full load, so that the compressor reaches the highest efficiency and reaches the maximum utilization degree.

After reaching the set target frequency or the highest frequency required by the limit, the compressor enters in the frequency retaining stage and operates at the set target frequency or at the highest frequency reaching the limit requirement.

Specifically, in the frequency descending stage, when the detected temperature rises to $T_{11}°$ C. in the first drying mode, the operation frequency of the frequency conversion compressor decreases from the target frequency $f_n$ Hz to $f_1$ Hz and the open degree of the expansion valve is adjusted to the pulse open degree $k_{11}$ from $k_{1n}$. When the detected temperature rises to $T_{21}°$ C. in the second drying mode, the operation frequency of the frequency conversion compressor decreases from the target frequency $f_n$ Hz to $f_1$ Hz and the open degree of the expansion valve is adjusted to the pulse open degree $k_{21}$ from $k_{2n}$. Wherein, $T_{11} > T_{21}$, $k_{1n} > k_{2n}$, $k_{11} > k_{21}$.

In the frequency descending stage, when the detected temperature rises to $T_{12}°$ C. in the first drying mode, the operation frequency of the frequency conversion compressor decreases from $f_1$ Hz to $f_2$ Hz and the open degree of the expansion valve is adjusted to the pulse open degree $k_{12}$ from $k_{11}$ until the detected temperature rises to $T_{1m}°$ C. Then, the operation frequency of the frequency conversion compressor decreases from $f_2$ Hz to $f_m$ Hz and the open degree of the expansion valve is adjusted to the pulse open degree $k_1m$ from $k_{12}$ until the clothes drying operation is finished. When the detected temperature rises to $T_{22}°$ C. in the second drying mode, the operation frequency of the frequency conversion compressor decreases from $f_1$ Hz to $f_2$ Hz and the open degree of the expansion valve is adjusted to the pulse open degree $k_{22}$ from $k_{21}$ until the detected temperature rises to $T_{2m}°$ C. Then, the operation frequency of the frequency conversion compressor decreases from $f_2$ Hz to $f_m$ Hz and the open degree of the expansion valve is adjusted to the pulse open degree $k_{2m}$ from $k_{22}$ until the clothes drying operation is finished. Wherein, $T_{12} > T_{22}$, $T_{1m} > T_{2m}$, $k_{12} > k_{22}$, and $k_{1m} > k_{2m}$.

The $k_{1n} < k_{11} < k_{12}$, and $k_{2n} < k_{21} < k_{22}$; the operation frequency of the frequency conversion compressor gradually decreases from the set target frequency in stages, and the open degree of the expansion valve is correspondingly turned up in stages.

When the clothes dryer starts operating, the expansion value is adjusted to close to a fully closed state and then opened to a first open degree and then the compressor is started; after the compressor finishes frequency ascending, the expansion valve is opened to a second open degree and the compressor enters in the frequency retaining stage. Preferably, when the clothes dryer starts operating, the expansion valve is closed firstly, and then opened for a small open degree and then closed for a large open degree, such operations are repeated for several times to ensure that the expansion valve is in a fully closed state. When the clothes dryer starts operating, the expansion valve firstly executes a fully closed action; if the maximum open degree is 500 pulses, the expansion valve is closed for 500 pulses at first, and then opened for 5 pulses and then closed for 60 pulses, such operations are repeated 5 times to ensure that the expansion valve is in a fully closed state. After completion, the expansion valve is opened to the initial position 100-pulse open degree, and the compressor starts. At the end of frequency ascending of the compressor, the expansion valve is opened to the initial position 200-pulse open degree. The compressor enters in the frequency retaining stage.

As illustrated in FIG. 1, the clothes dryer further comprises a third drying mode. The operation time of the compressor in a high frequency band in the third drying mode is shorter than the operation time of the compressor in the high frequency band in the second drying mode; the open degree of the expansion valve in the third drying mode when it enters in the frequency descending stage is smaller than the open degree of the expansion valve in the second drying mode when it enters in the frequency descending stage. The drying speed in the third drying mode is lower than the drying speed in the second drying mode, but the noise in the third drying mode is lower than that in the second drying mode, and users can, according to their own actual conditions, select drying modes, and the control panel is provided with control buttons for drying modes so that the users can select drying modes through the buttons on the panel. In the third drying mode, the operation frequency or speed of the fan is lower than the operation frequency or speed of the fan in the second drying mode. Therefore, noise can be further lowered.

In the frequency descending stage, when the detected temperature rises to $T_{31}°$ C. in the third drying mode, the operation frequency of the frequency conversion compressor decreases from the target frequency $f_n$ Hz to $f_1$ Hz and the open degree of the expansion valve is adjusted to the pulse open degree $k_{31}$ from $k_{3n}$. When the detected temperature rises to $T_{21}°$ C. in the second drying mode, the operation frequency of the frequency conversion compressor decreases from the target frequency $f_n$ Hz to $f_1$ Hz and the open degree of the expansion valve is adjusted to the pulse open degree $k_{21}$ from $k_{2n}$. Wherein, $T_{21} > T_{31}$, $k_{2n} > k_{3n}$, $k_{21} > k_{31}$.

In the frequency descending stage, when the detected temperature rises to $T_{32}°$ C. in the third drying mode, the operation frequency of the frequency conversion compressor decreases from $f_1$ Hz to $f_2$ Hz and the open degree of the expansion valve is adjusted to the pulse open degree $k_{32}$ from $k_{31}$ until the detected temperature rises to $T_{3m}°$ C. Then, the operation frequency of the frequency conversion compressor decreases from $f_2$ Hz to $f_m$ Hz and the open degree of the expansion valve is adjusted to the pulse open degree $k_{3m}$ from $k_{32}$ until the clothes drying operation is finished. When the detected temperature rises to $T_{22}°$ C. in the second drying mode, the operation frequency of the frequency conversion compressor decreases from $f_1$ Hz to $f_2$ Hz and the open degree of the expansion valve is adjusted to the pulse open degree $k_{22}$ from $k_{21}$ until the detected temperature rises to $T_{2m}°$ C. Then, the operation frequency of the frequency conversion compressor decreases from $f_1$ Hz to $f_2$ Hz and the open degree of the expansion valve is adjusted to the pulse open degree $k_{2m}$ from $k_{22}$ until the clothes drying operation is finished. Wherein, $T_{22} > T_{32}$, $T_{2m} > T_{3m}$, $k_{22} > k_{32}$, and $k_{2m} > k_{3m}$.

The $k_{3n} < k_{31} < k_{32}$. The operation frequency of the frequency conversion compressor gradually decreases from the set target frequency in stages, and the open degree of the expansion valve is correspondingly turned up in stages.

The first drying mode: the open degree of the expansion valve is larger than that in other modes at the same frequency band, the flow is larger, and the pressure is lower. At the end of frequency ascending of the compressor, the expansion valve is opened to the initial position 210-pulse open degree. The compressor enters in the frequency retaining stage.

The operation frequency of the frequency conversion compressor enters in the frequency descending stage. When the condenser surface temperature rises to 42° C., the frequency decreases to 50 Hz from the target rotation rate 60 Hz and the open degree of the expansion valve is adjusted to 230-pulse open degree at the same time. When the condenser surface temperature rises to 52° C., the frequency decreases to 40 Hz from the rotation rate 50 Hz and the open degree of the expansion valve is adjusted to 250-pulse open degree. When the condenser surface temperature rises to 57° C., the frequency decreases to 30 Hz from the rotation rate 40 Hz and the open degree of the expansion valve is adjusted to 270-pulse open degree. The compressor operates at the rotation rate of 30 Hz till the end of the drying operation.

The second drying mode: the condensation temperature corresponding to each frequency band of the compressor is lower than that in the first drying mode so that the compressor enters in a low-frequency operation stage as quickly as possible due to the reduction of the target condensation temperature. The temperature of clothes in a drum is low, less refrigerant is evaporated by the evaporator when the frequency conversion compressor operates at the same operation frequency band, the open degree of the expansion valve is set smaller than that in the first drying mode at the same frequency band, the flow is smaller, and the pressure is higher. At the end of frequency ascending of the compressor, the expansion valve is opened to the initial position 200-pulse open degree. The operation frequency of the frequency conversion compressor enters in the frequency retaining stage. When the condenser surface temperature rises to 32° C., the frequency decreases to 50 Hz from the target rotation rate 60 Hz and the open degree of the expansion valve is adjusted to 220-pulse open degree at the same time. When the condenser surface temperature rises to 42° C., the frequency decreases to 40 Hz from the rotation rate 50 Hz and the open degree of the expansion valve is adjusted to 240-pulse open degree. When the condenser surface temperature rises to 47° C., the frequency decreases to 30 Hz from the rotation rate 40 Hz and the open degree of the expansion valve is adjusted to 260-pulse open degree. The compressor operates at the rotation rate of 30 Hz till the end of the drying operation.

The third drying mode: the condensation temperature corresponding to each frequency band of the compressor is lower than that in the second drying mode so that the compressor enters in a low-frequency operation stage as quickly as possible due to the reduction of the target condensation temperature. The temperature of clothes in a drum is low, less refrigerant is evaporated by the evaporator when the frequency conversion compressor operates at the same operation frequency band, the open degree of the expansion valve is set smaller than that in the second drying mode at the same frequency band, the flow is smaller, and the pressure is higher. At the end of frequency ascending of the compressor, the expansion valve is opened to the initial position 190-pulse open degree. The compressor enters in the frequency retaining stage.

When the condenser surface temperature rises to 27° C., the frequency decreases to 50 Hz from the target rotation rate 60 Hz and the open degree of the expansion valve is adjusted to 210-pulse open degree at the same time. When the condenser surface temperature rises to 37° C., the frequency decreases to 40 Hz from the rotation rate 50 Hz and the open degree of the expansion valve is adjusted to 230-pulse open degree. When the condenser surface temperature rises to 42° C., the frequency decreases to 30 Hz from the rotation rate 40 Hz and the open degree of the expansion valve is adjusted to 250-pulse open degree. The compressor operates at the rotation rate of 30 Hz till the end of the drying operation.

Figure 2:
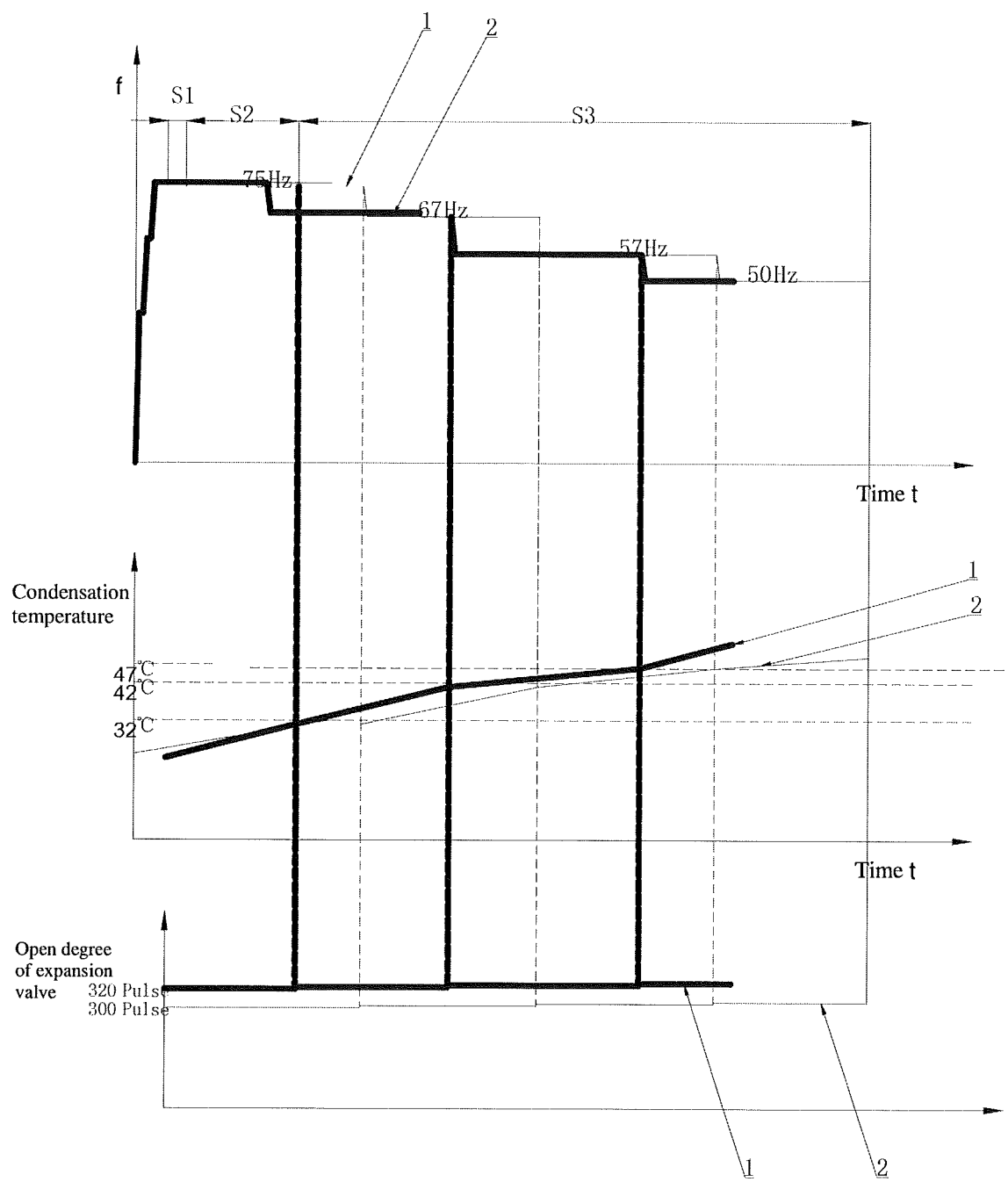
FIG. 2 is a diagram showing the relationship between the open degree of the expansion valve and the drying modes according to the present disclosure.

As illustrated in FIG. 2, 1 refers to the fast drying mode curve and 2 refers to the general drying mode curve. It is seen that operation time at a high frequency band in the fast drying mode is long, operation time at a high frequency band in the general drying mode is short, and the open degree of the expansion valve increases in a frequency descending sequence; but the initial reference open degree is relatively large.

Figure 3:
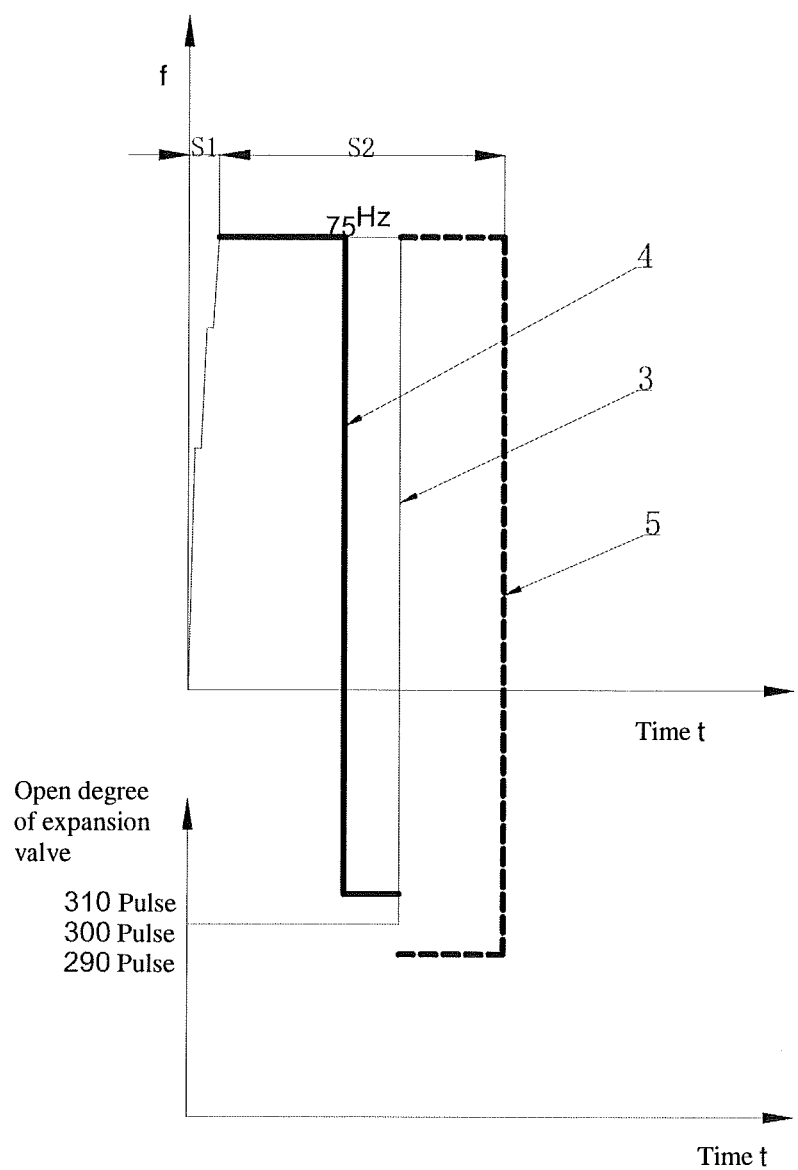
FIG. 3 is a diagram showing the relationship between the open degree of the expansion valve and the operation time at a certain frequency according to the present disclosure.

As illustrated in FIG. 3, in comparison of time of each frequency stage with the reference time, quick frequency descending means high temperature rise and more refrigerant evaporated, and then the open degree of the expansion valve is turned up, or otherwise the open degree is turned down. The operation time at a high frequency band is stated as an example; the curve 3 is the corresponding curve of the reference operation time at a high frequency and the open degree of the expansion valve, the curve 4 is the corresponding curve of the actual operation time at a high frequency and the open degree of the expansion valve in the case where the actual operation time at a high frequency is shorter than the reference operation time at a high frequency, and the curve 5 is the corresponding curve of the actual operation time at a high frequency and the open degree of the expansion valve in the case where the actual operation time at a high frequency is longer than the reference operation time at a high frequency. The actual operation time in the curve 4 is shorter than the reference time, and the open degree of the expansion valve is turned up; the actual operation time in the curve 5 is longer than the reference time, and the open degree of the expansion valve is turned down.

In each stage, the expansion valve is also adjusted according to the parameters such as current/power; current/power increases, and then the open degree of the expansion valve is turned up; the current/power decreases, and then the open degree of the expansion valve is turned down.

Figure 4:
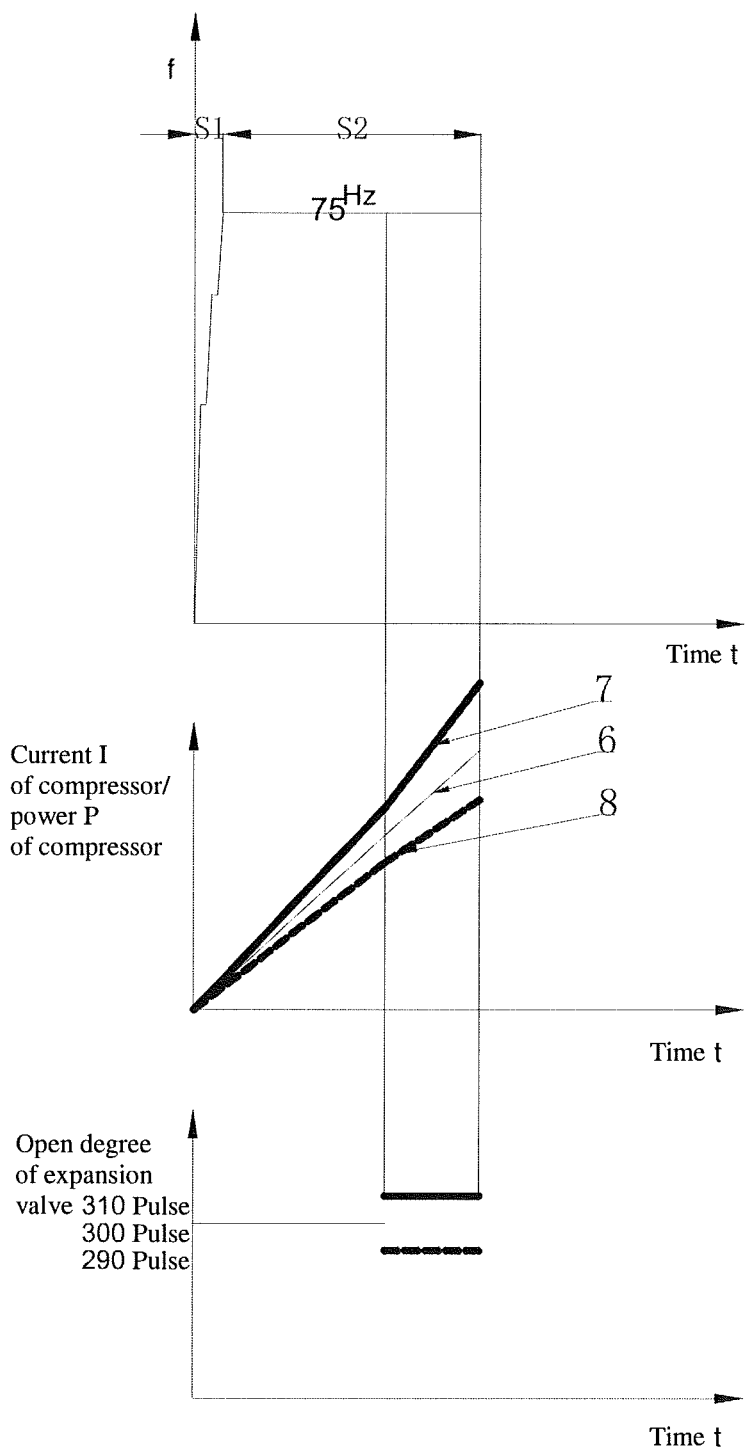
FIG. 4 is a diagram showing the relationship between the open degree of the expansion valve and power/current according to the present disclosure, wherein, S1. frequency ascending stage; S2. frequency retaining stage; S3. frequency descending stage; 1. the fast drying mode curve; 2. the general drying mode curve; 3. the corresponding curve of the reference operation time at a high frequency and the open degree of the expansion valve; 4. the corresponding curve of the actual operation time at a high frequency and the open degree of the expansion valve; 5. the corresponding curve of the actual operation time at a high frequency and the open degree of the expansion valve; 6. the corresponding curve of the reference power/current and the open degree of the expansion valve; 7. the corresponding curve of actual power/current and the open degree of the expansion valve; 8, the corresponding curve of actual power/current and the open degree of the expansion valve.

As illustrated in FIG. 4, in comparison of current/power of each frequency stage with the reference current/power, current/power is high, the load of the compressor is high, the temperature is high, more refrigerant is evaporated, and then the open degree of the valve can be turned up, or otherwise, the open degree is turned down. In the case of a high frequency band as an example, the curve 6 is the corresponding curve of the reference power/current and the open degree of the expansion valve, the curve 7 is the corresponding curve of actual power/current and the open degree of the expansion valve in the case where the actual power/current is higher than the reference power/current, and the curve 8 is the corresponding curve of actual power/current and the open degree of the expansion valve in the case where the actual power/current is lower than the reference power/current. The actual power/current in the curve 7 is higher than the reference power/current and the open degree of the expansion valve is turned up; the actual power/current in the curve 8 is lower than the reference power/current and the open degree of the expansion valve is turned down.

In the present disclosure, the open degree of the expansion valve directly corresponds to the parameters of the frequency conversion compressor, thus avoiding the indirect adjustment that change of the parameters causes the temperature change and then causes the change of the open degree of the expansion valve. Therefore, the error caused by the multiple steps of measurement in the indirect adjustment can be reduced, control becomes more accurate, and the drying efficiency is high.

Some users want to wear a piece of clothing in a hurry and need to quickly dry without considering the noise and power consumption, the drying speed is the most important criteria. And in this case, the users can select the first drying mode, i.e., the fast drying mode, so that the clothes in need can be dried quickly. Some users wash clothes at night and plans to wear them the next day, so they have a long night to dry the clothes; however, they also want take a rest at night without the disturbance by a clothes dryer. In this case, a quiet clothes dryer is desirable without considering drying speed and power consumption and low noise is the most important criteria. Therefore, the third drying mode, i.e., the quiet mode, is selected to lower the noise to the minimum so that the clothes are dried in a quiet way without disturbing the rest of the users. If users do not want to dry clothes in a hurry or do not mind of being disturbed by drying noise during the rest, they can select the second drying mode so that energy saving and drying speed reach an appropriate match.

The clothes dryer according to the present disclosure provides a variety of drying modes so that users can choose proper drying modes according to their own needs. Users are provided with more choices, one machine can be applied to different crowds, thus improving the versatility of the clothes dryer; moreover, with a variety of drying modes, the clothes dryer enhances the diversity and flexibility of the clothes dryer, meets the people's different demands in different periods of time and further fits people's diversified, high-speed, efficient pace of life, thus enhancing the humane friendliness of the clothes dryer.

Furthermore, in the plurality of drying modes of the clothes dryer according to the present disclosure, the frequency of the frequency conversion compressor rises to a set target frequency, and the drying modes are divided by the operation time at the set target frequency, i.e., a high frequency band, the compressor operates under a full load in the plurality of drying modes so that the compressor reaches the highest efficiency and thus can be used to the greatest extent. The clothes dryer avoids working for a long time under a low load with low efficiency; in addition, the clothes dryer also avoids working under a high load for a long time, thereby not causing a damage to the compressor or reducing the service life of the compressor.

The above description only relates to the preferred embodiments of the present disclosure. It should be noted that, for the person of ordinary skill in the art, variants and modifications also may be made without departing from the principles of the present disclosure, and these variants and modifications also should be considered as falling within the protection scope of the present disclosure.

The invention claimed is:

1. A method for controlling an expansion valve of a frequency conversion heat pump clothes dryer, a frequency conversion compressor of the clothes dryer comprising a frequency ascending stage, a frequency retaining stage, and a frequency descending stage, the method comprising:
  adjusting an open degree of the expansion valve through one of parameters selected from a group comprising an operation time at a certain frequency, power, current and an operation frequency of the frequency conversion compressor;
  wherein the clothes dryer includes a first drying mode and a second drying mode, an operation time of the frequency conversion compressor in a high-frequency band in the first drying mode is longer than the operation time of the frequency conversion compressor in the high-frequency band in the second drying mode, and the open degree of the expansion valve in the first drying mode when it enters in the frequency descending stage is larger than the open degree of the expansion valve in the second drying mode when it enters in the frequency descending stage.

2. The method for controlling the expansion valve of the frequency conversion heat pump clothes dryer according to claim 1, wherein: in a same clothes drying mode, a reference value of the operation time at the certain frequency or power or current is set, and an actual value of the operation time at the frequency or power or current of the compressor and the set reference value are compared;
  if the actual value of the operation time at the frequency is less than the set reference value or the actual value of the power or current is greater than the set reference value, the open degree of the expansion value is turned up;
  and if the actual value of the operation time at the frequency is greater than the set reference value or the actual value of the power or current is less than the set reference value, the open degree of the expansion valve is turned down.

3. The method for controlling the expansion valve of the frequency conversion heat pump clothes dryer according to claim 2, wherein: in the frequency descending stage, the operation frequency of the frequency conversion compressor gradually decreases from a set target frequency in stages, and the open degree of the expansion valve is correspondingly turned up in stages.

4. The method for controlling the expansion valve of the frequency conversion heat pump clothes dryer according to claim 2, wherein if a target operation time or power or current at the same frequency is great, the open degree of the expansion value is large.

5. The method for controlling the expansion valve of the frequency conversion heat pump clothes dryer according to claim 2, wherein: when the clothes dryer starts operating, the expansion valve is adjusted to a fully closed state and then opened to a first open degree and then the compressor is started;
  after the compressor finishes frequency ascending, the expansion valve is opened to a second open degree and the compressor enters in the frequency retaining stage.

6. The method for controlling the expansion valve of the frequency conversion heat pump clothes dryer according to claim 2, wherein: the clothes dryer further comprises a third drying mode, the operation time of the compressor in the high-frequency band in the third drying mode is shorter than the operation time of the frequency conversion compressor in the high-frequency band in the second drying mode,
  and the open degree of the expansion valve in the third drying mode when it enters in the frequency descending stage is smaller than the open degree of the expansion valve in the second drying mode when it enters in the frequency descending stage.

7. The method for controlling the expansion valve of the frequency conversion heat pump clothes dryer according to claim 1, wherein: in the frequency descending stage, the operation frequency of the frequency conversion compressor gradually decreases from a set target frequency in stages, and the open degree of the expansion valve is correspondingly turned up in stages.

8. The method for controlling the expansion valve of the frequency conversion heat pump clothes dryer according to claim 7, wherein if a target operation time or power or current at the same frequency is great, the open degree of the expansion value is large.

9. The method for controlling the expansion valve of the frequency conversion heat pump clothes dryer according to claim 7, wherein: when the clothes dryer starts operating, the expansion valve is adjusted to a fully closed state and then opened to a first open degree and then the compressor is started;

after the compressor finishes frequency ascending, the expansion valve is opened to a second open degree and the compressor enters in the frequency retaining stage.

10. The method for controlling the expansion valve of the frequency conversion heat pump clothes dryer according to claim 7, wherein: the clothes dryer further comprises a third drying mode, the operation time of the compressor in the high-frequency band in the third drying mode is shorter than the operation time of the frequency conversion compressor in the high-frequency band in the second drying mode, and the open degree of the expansion valve in the third drying mode when it enters in the frequency descending stage is smaller than the open degree of the expansion valve in the second drying mode when it enters in the frequency descending stage.

11. The method for controlling the expansion valve of the frequency conversion heat pump clothes dryer according to claim 1, wherein if a target operation time or power or current at the same frequency increases, the open degree of the expansion value increases.

12. The method for controlling the expansion valve of the frequency conversion heat pump clothes dryer according to claim 11, wherein: in the frequency descending stage, when a detected temperature rises to $T_{11}$° C. in the first drying mode, the operation frequency of the frequency conversion compressor decreases from a target frequency $f_n$ Hz to $f_1$ Hz and the open degree of the expansion valve is adjusted to a pulse open degree $k_{11}$ from $k_{1n}$;

when the detected temperature rises to $T_{21}$° C. in the second drying mode, the operation frequency of the frequency conversion compressor decreases from the target frequency $f_n$ Hz to $f_1$ Hz and the open degree of the expansion valve is adjusted to the pulse open degree $k_{21}$ from $k_{2n}$; wherein, $T_{11}>T_{21}$, $k_{1n}>k_{2n}$, $k_{11}>k_{21}$.

13. The method for controlling the expansion valve of the frequency conversion heat pump clothes dryer according to claim 1, wherein: when the clothes dryer starts operating, the expansion valve is adjusted to a fully closed state and then opened to a first open degree and then the compressor is started;

after the compressor finishes frequency ascending, the expansion valve is opened to a second open degree and the compressor enters in the frequency retaining stage.

14. The method for controlling the expansion valve of the frequency conversion heat pump clothes dryer according to claim 1, wherein: the clothes dryer further comprises a third drying mode, the operation time of the compressor in the high-frequency band in the third drying mode is shorter than the operation time of the frequency conversion compressor in the high-frequency band in the second drying mode, and the open degree of the expansion valve in the third drying mode when it enters in the frequency descending stage is smaller than the open degree of the expansion valve in the second drying mode when it enters in the frequency descending stage.

15. The method for controlling the expansion valve of the frequency conversion heat pump clothes dryer according to claim 14, wherein: in the frequency descending stage, when the detected temperature rises to $T_{31}$° C. in the third drying mode, the operation frequency of the frequency conversion compressor decreases from the target frequency $f_n$ Hz to $f_1$ Hz and the open degree of the expansion valve is adjusted to the pulse open degree $k_{31}$ from $k_{3n}$;

when the detected temperature rises to $T_{21}$° C. in the second drying mode, the operation frequency of the frequency conversion compressor decreases from the target frequency $f_n$ Hz to $f_1$ Hz and the open degree of the expansion valve is adjusted to the pulse open degree $k_{21}$ from $k_{2n}$; wherein, $T_{21}>T_{31}$, $k_{2n}>k_{3n}$, $k_{21}>k_{31}$.

16. The method for controlling the expansion valve of the frequency conversion heat pump clothes dryer according to claim 1, wherein: in the frequency descending stage, when a detected temperature rises to $T_{11}$° C. in the first drying mode, the operation frequency of the frequency conversion compressor decreases from a target frequency $f_n$ Hz to $f_1$ Hz and the open degree of the expansion valve is adjusted to a pulse open degree $k_{11}$ from $k_{1n}$;

when the detected temperature rises to $T_{21}$° C. in the second drying mode, the operation frequency of the frequency conversion compressor decreases from the target frequency $f_n$ Hz to $f_1$ Hz and the open degree of the expansion valve is adjusted to the pulse open degree $k_{21}$ from $k_{2n}$; wherein, $T_{11}>T_{21}$, $k_{1n}>k_{2n}$, $k_{11}>k_{21}$.

* * * * *